United States Patent [19]

Fayfield et al.

[11] 4,369,401

[45] Jan. 18, 1983

[54] VALVE POSITION MONITOR AND CONTROL SYSTEM

[75] Inventors: Robert W. Fayfield, Excelsior; Kenneth B. Fontaine, Maple Grove, both of Minn.

[73] Assignee: Scovill Manufacturing Co., Waterbury, Conn.

[21] Appl. No.: 144,381

[22] Filed: Apr. 28, 1980

Related U.S. Application Data

[62] Division of Ser. No. 921,443, Jul. 3, 1978.

[51] Int. Cl.³ .............................................. G05B 23/02
[52] U.S. Cl. ..................................... 318/565; 318/626; 361/28
[58] Field of Search ...................... 318/565, 626, 484; 361/28, 29

[56] References Cited

U.S. PATENT DOCUMENTS

| | | | |
|---|---|---|---|
| 3,412,280 | 11/1968 | DeGrande | 318/565 |
| 3,778,696 | 12/1973 | Walters et al. | 318/565 |
| 3,969,664 | 12/1976 | Camilleri et al. | 318/565 |
| 4,032,094 | 6/1977 | Morgan et al. | 318/565 X |
| 4,198,025 | 4/1980 | Lowe et al. | 318/484 X |

*Primary Examiner*—B. Dobeck
*Attorney, Agent, or Firm*—Price, Heneveld, Huizenga & Cooper

[57] ABSTRACT

A valve position monitoring and control system incorporates a proximity sensor positioned near a movable valve element to detect the operational position of the valve and includes circuit means coupled to a valve actuating solenoid for deactivating the solenoid in the event the valve fails to respond to command signals for positioning the valve in a predetermined position. In one embodiment, the system incorporates a pair of series connected valves used in presses which valves in turn are operated by solenoid actuated pilot valves. In the event either one of the valves do not operate either by opening within a predetermined time after actuation or closing within a predetermined time after their deactuation, the system of the present invention will not permit further operation of the valves until the system has been manually reset.

6 Claims, 2 Drawing Figures

VALVE POSITION MONITOR AND CONTROL SYSTEM

This is a divisional of application Ser. No. 921,443, filed July 3, 1978.

BACKGROUND OF THE INVENTION

The present invention relates to a valve monitoring and control system.

In the machinery control industry by which presses, brakes, or the like are actuated by fluid controlled valves, the determination of the position of the movable valve elements is important since upon initial installation, loss of fluid pressure, during servicing, or during replacement of the valves operation of the machinery controlled thereby can be accurately predicted. Without such a control system, the punch press or similar device controlled by the valve can unexpectedly or inadvertently be operated upon start up or return of fluid pressure resulting in serious injury to operators, maintenance personnel, or others. The problem is particularly serious when fluid type poppet valves including a shiftable poppet element are employed which can be moved to any one of a plurality of positions to control the passage of pressurized fluid through the valve.

Several mechanical methods are known for attempting fail safe operation of such valves typically by providing bias springs to maintain the valves in a predetermined position in the event air pressure is lost. In some cases detents are employed to also provide a similar function. The problem with such prior art is that the fail safe features themselves are subject to wear and failure during the continued operation of the valves.

U.S. Pat. No. 4,046,165 issued Sept. 6, 1977, to Rose, Sr., et al illustrates an improvement over this prior art by which a valve positioning means is attached to the valve housing which does not impede normal operation of the valve and which assures the valve is in a predetermined position when air pressure is lost. Although the invention of the above identified patent represents a significant improvement over the prior art, it is desirable to continuously monitor the condition of actuation of a valve and particularly dual valves used for presses and the like to determine if the actual state of the valve corresponds to the state called for by the control signal to the valve actuating solenoids.

SUMMARY OF THE PRESENT INVENTION

The valve position monitor and control system of the present invention incorporates proximity sensing means positioned in the vicinity of a movable valve element for detecting the position of the valve element and provides a signal applied to a logic circuit which also receives control signals from the valve actuating circuitry such that in the event the valve does not respond to the control signal in a predetermined manner, the valve actuation solenoid is deactivated.

In one embodiment, the system of the present invention is employed with a dual in-line valve by which a pair of solenoid actuated pilot valves are employed to control a pair of series connected poppet valves. In this embodiment, a pair of proximity sensors are incorporated to detect the state of both of the poppet valves and in the event either one of the poppet valves does not respond to a command control signal, both of the valves actuating solenoids are deactuated. Protection circuit means are also provided preventing reactuation of the valves until such time as the control circuit of the present invention has been manually reset by the operator.

These and other features, advantages, and objects of the present invention can best be understood by reading the following description thereof together with the drawings in which:

DETAILED DESCRIPTION OF THE PREFERRED EMBODIMENT

Figure 1:
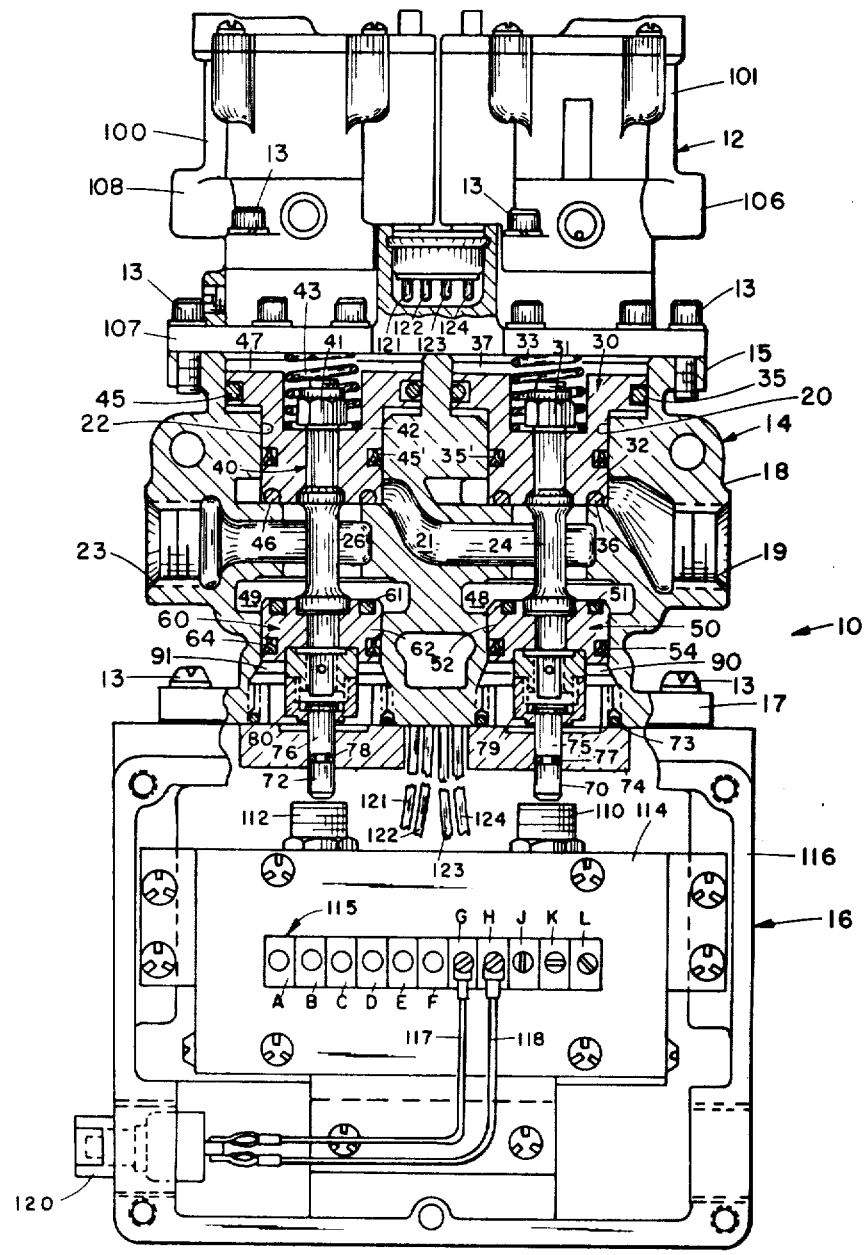
FIG. 1 is a side elevational view partly broken away and in cross section of a dual valve system incorporating the present invention.

Referring initially to FIG. 1 there is shown a valve assembly incorporating the present invention. The valve 10 includes a pilot valve assembly 12 including two pilot valves mounted above a poppet valve assembly 14 in turn mounted to the monitor and control circuit assembly 16. Valve assembly 14 includes an upper flange 15 coupled to housing 107 and a lower flange 17 to which the pilot valve assembly 12 and monitor assembly 16 are secured, respectively, by suitable fastening means such as bolts 13 and threaded apertures extending through the housings.

Valve assembly 14 includes an air inlet 19 coupled to a source of pressurized air (not shown) and an air outlet 23 typically coupled to a pneumatic clutch operator associated with a punch press or the like to be actuated by air passing through the valve. The valve assembly includes a pair of series coupled poppet valves and comprises a housing 18 having configurated bores 20 and 22 formed vertically therethrough for receiving the movable valve elements 24 and 26, respectively. A connecting port 21 couples bore 20 to bore 22 and provides in part the communication path for air from inlet 19 to outlet 23. Valve assembly 14 thus includes a first poppet valve subassembly 30 and a substantially identical second poppet valve assembly 40. Each of the valve assemblies include an upper piston 32 and 42, respectively, having an aperture to which one end of the movable valve elements 24 and 26 are secured by means of threaded end and nut 31 and 41, respectively. Compression bias springs 33 and 43 extend between the floor of housing 107 of assembly 14 into a circular recess in the top of pistons 32 and 42, respectively, urging the movable valve elements in the downwardly or valve closed position as shown in FIG. 1 in the absence of air pressure.

Pistons 32 and 42 each include an enlarged head with an annular recess for receiving seals 35 and 45 which seal the piston against the mating cylindrical wall of the bores 20 and 22, respectively. Intermediate seals 35' and 45' are also provided and positioned in annular recesses in the piston bodies for sealing the bodies to the reduced diameter cylindrical bore sections as shown in FIG. 1. Finally, the bottom of the upper pistons 32 and 42 include annular recesses receiving additional seals 36 and 46 which seat against sealing surfaces of the housing to form the closure seal between the inlet 19 and bore 20, and the connecting port 21 and bore 22, respectively. As will be described more fully hereinafter, the pilot valve assembly 12 provides biasing pressure to the space 37 and 47, respectively, above pistons 32 and 42 and below pistons 50 and 60 (space 90 and 91) when air is supplied to the pilot valve assembly but the valve actuating solenoids are deactuated to hold the spool valves in the closed position shown.

The first and second valve subassemblies 30 and 40 further include lower piston assemblies 50 and 60, respectively. The lower piston assemblies 50 and 60 each include a piston 52 and 62, respectively. Each piston includes an annular recess formed on its upper surface for receiving seals 51 and 61, respectively, for sealing against the lower horizontal surface of the enlarged bore portion when movable valve members 24 and 26 are actuated and moved to an upward position. The sides of pistons 52 and 62 also include annular recesses formed therein for seals 54 and 64 sealing against the side walls of the lower portion of bores 20 and 22, respectively. Coupled to the lower end of the movable valve members 24 and 26 are plungers 70 and 72 which extend through bottom end caps 74 secured to flange 17 by suitable fasteners and sealed thereto by an O-ring seal 73 fitted in a recess surrounding caps 74 as seen in FIG. 1. Plungers 70 and 72 extend through apertures 75 and 76 formed in caps 74 and are sealed thereto by means of O-rings 77 and 78 fitted in an annular recess surrounding the plungers. The upper end of the plungers are coupled to the movable valve elements 24 and 26 by means of collars 79 and 80 threadably secured to the pistons 52 and 62, respectively. The upper end of plungers 70 and 72 are enlarged to be captively held by the collars against the lower end of the movable valve elements and suitable locking means are employed for securing the collars to the pistons. The plungers 70 and 72 serve as detectable, removable valve element extensions for use in conjunction with the electrical control system as described below.

Below the lower pistons 52 and 62 there is formed in housing 18 chambers 90 and 91, respectively, which are supplied as described more fully hereinafter with pressure from the pilot valve assembly for forcing movable valve elements 24 and 26 of the poppet valve assemblies upwardly when the valves are actuated while at the same time the pressure on the upper chambers 37 and 47 of the upper pistons 32 and 42, respectively, is relieved. Housing 14 also includes exhaust ports (not shown) which communicate with chambers 48 and 49 above the lower pistons for exhausting pressure when the spool valves are closed.

Thus, the pair of poppet valve subassemblies provide vertically reciprocating valves which when in the lower position shown seal the inlet 19 from the outlet 23 and when moved upwardly to their open position, provide a communication path through inlet 19, chamber 25, connecting port 21, chamber 27, to outlet port 23. Having described the valve assembly 14, a brief description of the pilot valve assembly employed for actuating the poppet valves is now presented.

Pilot valve assembly 12 is substantially identical to the pilot valve system described in the above identified U.S. Pat. No. 4,046,165, the disclosure of which is incorporated herein by reference. A brief description, however, of the pilot valve assembly is presented here.

Figure 2:
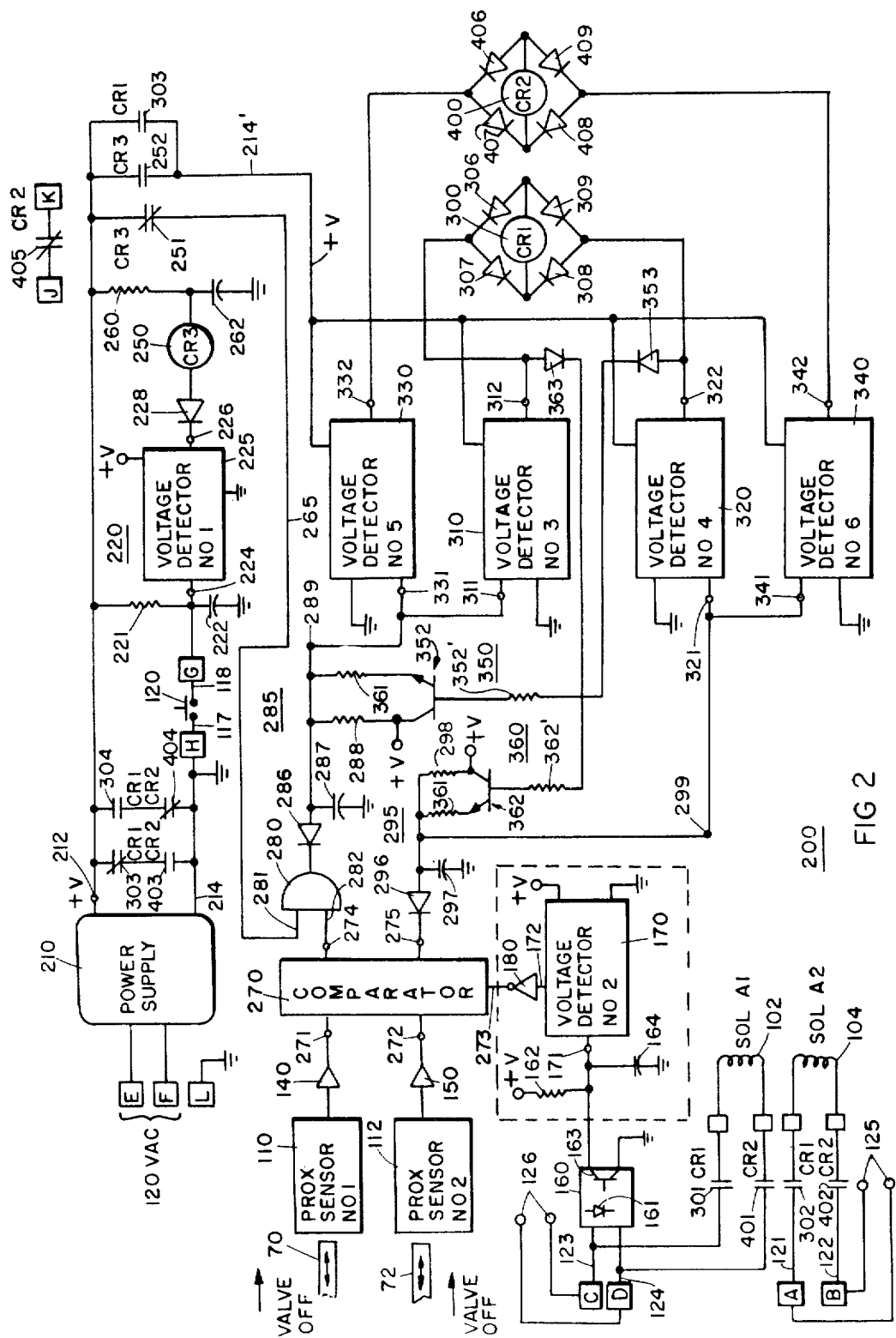
FIG. 2 is an electrical circuit diagram partly in block and schematic form of the system of the present invention.

The assembly includes a pair of vertically movable poppet valves within the poppet valve assembly housings 100 and 101 which are solenoid actuated and for such purpose are surrounded by solenoid coils 102 and 104 (FIG. 2). Housings 100 and 101 include a pair of inlets 106 and 108 which are coupled to the source of pressurized air.

In operation, when the solenoid valves are not actuated but air pressure is supplied to the pilot valve assembly 12, the pressurized air is supplied to both the chambers 37 and 47 above the upper pistons 32 and 42 of poppet valve assemblies, as well as to the chambers 90 and 91 below the lower piston assemblies by suitable ports (not shown) formed through housing 100 and housing 18 to provide a force to the plunger assemblies to hold the poppet valves in the closed position shown in FIG. 1. This is achieved since the top large pistons to bottom small pistons is a 2:1 area ratio and the air pressure biases the valves closed. When electrical energy, however, is applied to the solenoid coils 102 and 104, the poppet valves move to exhaust the pressure from the upper chambers 37 and 47 through poppet exhaust ducts (not shown) thereby relieving the pressure above the spool valve assembly upper pistons while still applying pressure below the lower pistons. This forces the spool valve assemblies upwardly to an open position opening the air flow path between inlet 19 and outlet 23.

Before describing the operation of circuit 200 for the various failure modes of the system, a description of the individual circuit elements and their interconnection is presented. Circuit 200 includes a power supply 210 having input terminals E and F of terminal strip 115 (FIG. 1) coupled to the 120 volt AC supply line. Terminal L comprises a system ground. Power supply 210 has a +V output terminal 212 and a ground terminal 214. The +V supply in the preferred embodiment comprises approximately 12 to 14 volts DC.

The valve controlling electrically actuated solenoids 102 and 104 are actuated by a command signal from the machine control applied to terminal pairs 125 and 126. This is a 120 volt AC signal applied through terminal strips A, B, C, and D and normally open relay contacts 301 and 401 for solenoid 102 and 302 and 402 for solenoid 104. These normally open relay contacts are associated respectively with actuating coils 300 and 400 which are in turn actuated by the control circuit receiving inputs from proximity detectors 110 and 112 as well as the machine control command signal input at terminal 126.

As can be seen, each of the relays 300 and 400 must be actuated to actuate either one of the solenoids 102 and 104 since each of the relays has a normally open contact in series with each of the relay coils. This cross coupling of the control relays with each of the solenoids provides inhibit means for the deactivation of both solenoids 102 and 104 which control the valve shown in FIG. 1 in the event either of the relays fail to operate in a prescribed manner.

The +V supply from power supply 210 is supplied to a power supply bus 214' through contacts 303 associated with relay 300 when relay 300 is actuated. Contacts 303 are latching contacts to supply the +V voltage to the circuit once it has been momentarily applied by the reset circuit 220.

The reset circuit which activates the control circuit for operation both when power is initially applied and subsequent to a failure by actuation of either of the reset switch 120 or by disconnecting or reconnecting the power supply. The reset circuit includes a timer including an RC circuit comprising resistor 221 coupled from terminal 212 to input terminal 224 of a first voltage detector 225 and a capacitor 222 coupled from the input terminal to ground. When power is initially applied from terminal 212, capacitor 222 will be in an uncharged state and thus the voltage at input terminal 224 will be near zero and the output at output terminal 226 will be at a logic '1' state. A diode 228 having its cathode coupled to terminal 226 has its annode coupled to one terminal of the actuating coil of relay 250 having its remaining terminal coupled to the junction of resistor 260 and capacitor 262.

When power is initially applied, therefore, diode 228 is reversed biased and capacitor 262 charges through resistor 260. At the same time, capacitor 222 is charging and once it reaches approximately 60 percent of the +V voltage, the voltage detector 225 reverses its output state forward biasing diode 228 permitting capacitor 262 to discharge through relay 250 which momentarily closes contacts 252 to apply +V to the control circuit while simultaneously opening normally closed contacts 251 associated with relay 250 and to provide a logic '0' signal applied to terminal 281 of AND gate 280. As capacitor 262 discharges rapidly through relay 250, the control relay then de-energizes since the current through resistor 260 is insufficient to maintain its contacts closed. Thus, relay 250 will automatically provide supply +V only for a relatively short period of time to bus 214' causing deactivation of the system in the event the control circuit does not activate properly for closing latching relay contacts 303.

The same effect is provided by reset switch 120 which, if momentarily activated, discharges capacitor 222 causing a logic '0' to be supplied to voltage detector input 224 and again back biasing diode 228 by the logic '1' output at terminal 226. When switch 120 is released, however, the capacitor is allowed to charge and the voltage detector reverses its state permitting capacitor 262 to discharge through relay 250 to again apply the momentary +V to the system as well as the logic '0' signal to terminal 281 of gate 280.

In the event relay 250 remains activated with its contacts 251 and 252 in their activated position (i.e., open and closed, respectively) closed contacts 251 provide a logic '1' output signal to gate 280 which, as described below, causes deactivation of the relays 300 and 400 to deactivate solenoids 102 and 104 and therefore close the poppet valves.

Thus, the circuit 220 provides two signals to the remaining elements of the control circuit. First, a power supplying conductor 214' provides activating power for the relays 300 and 400 and secondly a logic control signal is applied to gate 280 by conductor 265.

The externally supplied control input signals to circuit 200, as noted above, are applied by proximity detectors 110 and 112 as well as the input on terminals 126. Proximity sensor 110 provides a logic '1' output signal to the input of an amplifier 140 when no metal is detected (i.e., its associated spool valve is open or on) and a logic '0' output signal to amplifier 140 when metal is detected (i.e., the valve is closed or off). Amplifier 140 inverts this logic output signal from the sensor and applies it to input terminal 271 of a three input comparator circuit 270 having remaining input terminals 272 and 273. Similarly, the logic output signal from proximity sensor 112 is applied through an inverting amplifier 150 to input terminal 272 of comparator 270. The AC signal applied by the operator on terminals 126 to actuate the press or whatever device the system is employed with, is applied to an optical isolation circuit 160 which integrally includes a half-wave receiver circuit applying half-wave rectified 60 HZ signals to a light emitting diode 161 optically coupled to a photo transistor 163 to provide a pulsing discharge current path for capacitor 164 coupled between the collector and emitter terminals of transistor 163. Thus, with an input signal on terminals 126, capacitior 164 is discharged through transistor 163 and voltage detector 170 receives a logic '0' input signal at input terminal 171. With no 120 VAC input on terminal 126, (valves off or closed), capacitor 164 is charged through resistor 162 coupled to the +V supply to provide a logic '1' output signal to the input terminal 171 of voltage detector 170. The voltage detector 170 includes an output terminal 172 which is at a logic state the opposite of its input terminal. The output from terminal 172 is applied through inverter 180 to input terminal 273 of comparator 270.

With the valves in an off position, plungers 70 and 72 will be close to proximity sensors 110 and 112 and terminal pairs 126 will be de-energized. This causes the input signals to terminals 271, 272, and 273 to be at a logic '1' level. The comparator responds by providing at output terminal 274 a logic '0' and at output terminal 275 a logic '1'.

Comparator 270 in practice may comprise a pair of transistor amplifiers having their inputs commonly coupled to the junction of terminals 271, 272, and 273 with one transistor amplifier including two stages to provide the inverted output for providing two different logic level output signals when the inputs are at the same logic state. Amplifiers 140, 150, and 180 also may be transistor amplifiers which when the transistors are rendered conductive cause a logic '0' output signal to be applied to the comparator 270 since the collector voltages are pulled down to nearly ground or '0' logic level.

The output signals from comparator 270 are applied to alternately coupled voltage detectors 310, 320, 330, and 340 by means of delay circuits 285 and 295. Circuit 285 provides a valve turn on delay to prevent deactivation of the control circuit relays 300 and 400 until such time as the poppet valves shown in FIG. 1 have sufficient time to react to the control signal applied to solenoids 102 and 104. Similarly, the valve turn off delay circuit 295 permits the valve sufficient time to mechanically respond to deactivation of the valves before providing a failure mode or inhibit signal causing shutdown of the system. Circuits 285 and 295 are substantially identical and include steering diodes 286 and 296, respectively, having their cathodes couples to the output of gate 280 and terminal 275 of comparator 270, respectively, and their anodes coupled to charging capacitors 287 and 297, respectively. The remaining terminals of the capacitors are coupled to ground. Capacitors 287 and 297 are charged from the +V supply through charging resistors 288 and 298, respectively, and are discharged through diodes 286 and 296 when such diodes are forward biased by logic '0' signals applied to their cathodes from AND gate 280 and terminal 275 of comparator 270, respectively.

The junction capacitors 287 and 297 with the charging resistor 288 and 298 comprise the control output terminals 289 and 299 which are applied to the input terminals, respectively, of cross coupled voltage detectors 330 and 310 and 320 and 340, respectively. Thus, as seen in FIG. 2, input terminal 331 of voltage detector 330 is coupled to input terminal 311 of voltage detector 310. Similarly, input terminal 321 of voltage detector 320 is coupled to input terminal 341 of voltage detector 340.

Also coupled to these input terminals and to the control input terminals 289, 299 are transistor driven shunt circuits 350 and 360 each including an NPN transistor 352 and 362, respectively. The transistors have their collector terminals coupled to the +V supply and their emitter terminals coupled to the output terminals 289 and 299 by means of emitter resistors 351 and 361. When the transistors are rendered nonconductive, they do not affect the drive signals applied to the voltage detectors. When, however, rendered conductive by positive signals applied to their base terminals through base drive resistors 352' and 362' from steering diodes 353 and 363, respectively, they will apply a logic '1' signal to the input terminals of the associated voltage detectors.

Circuits 350 and 360 assure that the voltage detectors are nearly simultaneously activated once one of them are activated by providing a rapidly charging current path through the collector to emitter path for the timing capacitors 287 and 297.

Each of the voltage detectors 170, 225, 310, 320, 330, and 340 comprise commercially available 555 timer circuits with the input terminals comprising pins 2 and 6 commonly coupled and their power supply input terminals (pin 8) coupled to the +V supply and their common terminal (pin 1) coupled to ground. The output terminal comprises pin 3 of the commercially available integrated circuit chips and provide output logic level which is the opposite of the input signal applied thereto. Each of the voltage detectors respond to a threshold voltage approximately 60 percent of the +V supply to cause a logic state switch at this voltage level as this voltage level is passed either in an increasing or decreasing direction. In practical effect, the output circuit of the 555 chip provides either a ground signal (logic '0') or a power supplying signal (logic '1'). These circuits 310, 320, 330, and 340 are used to provide operating power for relays 300 and 400. In such application, the voltage detectors operate as controlled solid state switches applying power from bus 214' to relays 300 and 400.

Inasmuch as the input terminals 311 and 331 of voltage detectors 310 and 330 are coupled together, their output terminals 312 and 332 will be at the same voltage level as will output terminals 322 and 342 of the also similarly coupled detectors 320 and 340. Terminal 312 is coupled to the annode of steering diode 363 and to the junction of diodes 306 and 307 coupled together with diodes 308 and 309 in a bridge circuit as seen in FIG. 2. The output of terminal 322 of voltage detector 320 is coupled to the annode of diode 353 and to the junction of diodes 308 and 309. The actuating coil of relay 300 is coupled between the opposite legs of the bridge (i.e., between the junction of diodes 307 and 308 and the junction of diodes 306 and 309) such that the coil will be actuated whenever the output of detectors 310 and 320 are of opposite polarity. Similarly, volage detectors 330 and 340 are coupled to a bridge circuit comprising diodes 406, 407, 408, and 409 coupled as shown in FIG. 2. The voltage detectors 330 and 340 similarly are employed to actuate relay 400. Relay 400 includes normally closed relay contacts 405 coupled between terminals J and K of terminal strip 115 (FIG. 1) which can be used to provide an actuation signal for an alarm circuit indicating when a valve failure has occurred.

Relays 300 and 400 in addition to the contacts in series with solenoid coils 102 and 104 also include contacts coupled across the power supply 210 between terminals 212 and 214. Thus, relay 300 includes normally closed contacts 303' coupled in series with normally open contacts 403 of relay 400 the combination being coupled between terminals 212 and 214. A second leg comprising normally open contacts 304 and normally closed contacts 404 also are coupled between terminals 212 and 214. These contacts assure then in the event either of the relays 300 or 400 stick in a closed (actuated) position for any reason when power has been removed from them by virtue of the operation of the control circuit, the +V supply will be shunted opening the remaining one of the relays which has not failed and thereby removing power to solenoids 102 and 104 causing the deactivation of the spool valves.

Having described the electrical circuit components making up the control circuit of the present invention, a description of the operation of the circuit in the various failure modes is now presented.

OPERATION

As shown in FIG. 2, one normally open contact of each relay 300 and 400 is coupled in series with each leg of each valve actuating solenoid coil 102 and 104. Thus, if either relay drops out, no power can reach either of the solenoid coils. In operation, both relay circuits in effect monitor the other's operation, and if one fails the failure is detected by the control circuit and the other relay will be deactivated.

When power is first applied to the circuit, as discussed above, the power on reset circuit 220 activates relay CR1 and CR2 by virtue of the +V supplied by conductor 214' to the voltage detectors actuating the relays 300 and 400. This occurs by application of a logic '1' signal to input terminal 281 of gate 280 and a logic '1' from output terminal 274 of comparator 270 (having a zero output on input 273) such that gate 280 applies a logic '0' output discharging capacitor 287 and applying a logic '0' to voltage detectors 310 and 330. At the same time, voltage detectors 320 and 340 have a logic '1' applied to their inputs providing a logic '0' at output terminals 322 and 342 thereby applying power across the bridge circuits for activation of relays 300 and 400. Thus, when power is initially applied, the circuit is in a standby mode of operation permitting actuation of the valves by solenoids 102 and 104.

The first condition of operation is the actuation of the valves shown in FIG. 1 by application of a command signal for normal valve operation to open the valves for controlling the machine associated with the valves. When the command signal is applied to terminals 125 and 126, capacitor 164 is discharged through transistor 163 causing the output of voltage detector 170 to go to a logic '1' state. At this point in time, the output terminal 275 remains high and output terminal 274 switches to a logic '1' state charging the valve turn-on timing capacitor 287. Under normal operation, both poppet valve plungers 70 and 72 will be moved to the on position before this capacitor is charged to the threshold level of voltage detectors 310 and 330. As this occurs, output terminal 275 of the comparator switches to a logic '0' rapidly discharging the valve turn-off capacitor 297 causing the input of voltage detectors 320 and 340 to go to a '0' level which provides a logic '1' at output terminals 322 and 342. No current is now applied to the coils 300 and 400. However, the output signals applied to transistor 350 bypasses resistor 288 rapidly charging capacitor 287 to the threshold level of detectors 310 and 330 at which time their output terminals 332 and 312 go to a logic '0' applying current to relay coils 300 and 400 before they can drop out. Thus, transistor 350 assures the relays continued operation during the actuation of the valves when a normal response is received from the valves and detected by sensors 110 and 112.

In the event, however, that one or both of the valve plungers 70 or 72 do not move to the on position applying a logic '1' to the input terminals of amplifiers 140 and 150, before capacitor 287 was charged to the threshold level of detectors 310 and 330, their outputs 312 and 332 will go to a logic level '0'. Since detectors 320 and 340 remain at a '0' output level, no current is applied to the coils 300 and 400 dropping out these relays and disconnecting power to solenoids 102 and 104. As soon as relay 300 drops out, contact 303 opens, disconnecting power on line 214 from the voltage detectors and disables the circuit until manually reset by switch 120. At the same time, contact 405 of relay 400 will close which can be employed to control an alarm system indicating to the machine operator that a valve failure has occurred. The next sequence of operation is for valve turn-off either under normal or faulty operation.

Under normal turn-off operation of the valves, the plungers will both extend providing signals to the comparator circuit 270 causing capacitor 297 to charge to the threshold level of actuation of voltage detectors 320 and 340. Once the proximity detectors detect the plungers 70 and 72, output 274 of comparator 270 goes to a logic '0' level discharging capacitor 287 causing output of detectors 310 and 330 to go to a logic '1'. At the same time, however, this signal is applied to the base of transistor 360 shunting resistor 298 causing the rapid charging of capacitor 297 which forces the input of detectors 320 and 340 to go to a logic '1' level thus providing '0' outputs and maintaining relays 300 and 400 energized. Thus, as with normal valve turn-on, the circuit 200 remains in a standby mode with the solenoid actuated valves being controlled by terminal pairs 125 and 126.

In the event the valve turn-off is mechanically faulty and plungers 70 and 72 do not move to the right as shown in FIG. 2 indicating the valves are turned off, output 274 of comparator 270 remains at '1' permitting capacitor 287 to charge to the threshold level of detectors 310 and 330. This, in turn, de-energizes relays 300 and 400 shutting down the circuit as noted above under faulty valve actuation.

In the event the valves during receiving of an actuation or deactuation signal at terminals 125 and 126 do not move from the predetermined position of actuation or deactuation, their movement also will cause comparator 270 to apply a signal to the voltage detectors causing deactivation of the relays and hence the valves.

In addition to these standard failure modes, the control and logic circuit of the present invention also accommodates additional failure modes. If the proximity sensors fail either by being electrically open or shorted or by misadjustment, a fault signal will be applied to the comparator which will apply signals to the detectors causing shutdown of the relays. Also, if AC or low voltage DC (+V) power is lost, the system will shut down. Further, if either of the relay coils 300 or 400 are shorted or opened, the solenoids 102 and 104 will be deactivated.

Thus, with the system of the present invention, a valve monitoring and control circuit is provided by which if the valves do not move to a position commanded within the predetermined period of time thereby indicating improper valve operation, power applied to the valve actuating solenoids is removed and a contact closure results, which can be used for providing an operator alarm indicating the fault condition.

The system cannot be over-ridden and must be reset by activation of the manual reset button 120 or by disconnecting the power and reconnecting the power to reset the circuit. If the failure continues after reset, the system will again shut down until the problem is corrected.

It will become apparent to those skilled in the art that various modifications to the preferred embodiment of the invention described herein can be made by those skilled in the art without departing from the spirit or scope of the invention as defined by the appended claims.

The embodiments of the invention in which an exclusive property or privilege is claimed are defined as follows:

1. An electrical control circuit for monitoring and controlling the position of a movable element in a machine comprising:
   an electrically operated actuator for use in effecting movement of a movable element in a machine between at least two positions;
   detector means positionable to detect the position of the movable element and provide electrical output signals representative thereof;
   actuator circuit means coupled to said actuator for providing electrical input control signals to said actuator; and
   logic circuit means including delay means, said logic circuit means having an input coupled to said detector means and an output coupled to said actuator circuit means for generating inhibit signals applied to said actuator circuit for deactivating said actuator circuit means whenever the signals from said detector means indicate that the movable element is not positioned as commanded by said actuator circuit means within a predetermined delay period thereby indicating a system failure.

2. The circuit as defined in claim 1 wherin said delay means delays the generation of an inhibit signal until a predetermined time to permit a movable element to respond to a control signal from said actuator circuit means.

3. The circuit as defined in claim 2 wherein said logic circuit means includes a comparator circuit coupled to said detector means and to said actuator circuit means to compare signals representing the actual position of a movable element with signals representative of the commanded position of a movable element for providing an output signal representative of such comparison.

4. The circuit as defined in claim 3 and further including a power supply and solid state switch means coupled to said comparator and responsive to said output signals to apply an enable signal to said valve actuation circuit.

5. The circuit a defined in claim 4 and further including a reset circuit coupled between said power supply and said logic circuit means for providing operating power to at least portions of said logic circuit means, said reset circuit responsive to inhibit signals from said logic circuit means to remove operating power from said logic circuit means to inhibit said actuator circuit means.

6. The circuit as defined in claim 5 wherein said reset circuit includes a timer circuit and an operator actuated switch for actuating said timer circuit, said reset circuit further including relay switch means coupled to said timer circuit and responsive to signals therefrom for selectively applying operating power to said logic circuit means upon actuation of said timer.

* * * * *